(12) United States Patent
Barton et al.

(10) Patent No.: US 6,705,356 B2
(45) Date of Patent: Mar. 16, 2004

(54) TOUCHLESS AUTOMATIC FIBER OPTIC BEVERAGE/ICE DISPENSER

(76) Inventors: John C. Barton, 2807 Superior Ave., Middletown, OH (US) 45044; Norma J. Barton, 2807 Superior Ave., Middletown, OH (US) 45044

(*) Notice: Subject to any disclaimer, the term of this patent is extended or adjusted under 35 U.S.C. 154(b) by 0 days.

(21) Appl. No.: 10/425,628

(22) Filed: Apr. 30, 2003

(65) Prior Publication Data

US 2003/0155031 A1 Aug. 21, 2003

Related U.S. Application Data

(62) Division of application No. 10/008,846, filed on Nov. 13, 2001.

(51) Int. Cl.[7] .............................. B65B 1/04; B65B 3/04
(52) U.S. Cl. ................................. 141/2; 141/9; 141/18; 141/94; 141/95; 141/198
(58) Field of Search ....................... 141/2, 9, 18, 94–96, 141/192, 198, 100, 103, 104; 222/2, 23, 25, 52, 63, 207, 214, 333, 113; 137/1; 251/129.01, 129.04; 4/623; 250/216

(56) References Cited

U.S. PATENT DOCUMENTS

| | | | |
|---|---|---|---|
| 5,159,962 A | * 11/1992 | Dow | 141/98 |
| 5,458,147 A | * 10/1995 | Mauerhofer | 137/1 |
| 5,587,089 A | 12/1996 | Vogel et al. | 210/164 |
| 5,819,547 A | 10/1998 | Oh | 62/188 |
| 5,855,356 A | 1/1999 | Fait | 251/129.04 |
| 5,868,311 A | 2/1999 | Cretu-Petra | 236/12.12 |
| 6,045,007 A | 4/2000 | Simmons | 222/146.6 |
| 6,082,419 A | * 7/2000 | Skell et al. | 141/198 |
| 6,390,329 B1 | * 5/2002 | Maddox | 222/25 |

* cited by examiner

*Primary Examiner*—Timothy L. Maust

(57) ABSTRACT

A touchless automatic fiber optic beverage/ice dispenser (10, FIG. 1), dispenses ice and or beverages into a cup/container (26, FIG. 2), without user or cup/container touching any part of the machine, for sanitary effortless product filling activation. Any number of products may be dispensed from dispensing nozzles (16, 18, FIG. 1), in any volumes desired, allowing product mixing to customize beverages to the user's preference. Touchless automatically activated dispensing allows cup/container to be held in normal fashion to which people are currently accustomed. A filling indicator light (15, FIG. 1) illuminates during automatic filling. "On/off" mode selector (14, FIG. 1) prevents unauthorized product dispensation, and allows fast, easy machine cleaning. Resulting is a user friendly, commercially durable, sanitary touchless beverage/ice dispenser (10, FIG. 1), wherein germs and diseases are not transmitted from person to person via the machine, even during refilling.

35 Claims, 8 Drawing Sheets

TOUCHLESS AUTOMATIC FIBER OPTIC BEVERAGE/ICE DISPENSER

CROSS-REFERENCE TO RELATED APPLICATION

This application is a divisional of copending application Ser. No. 10/008,846, filed on Nov. 13, 2001, the entire disclosure of which is hereby incorporated by reference.

BACKGROUND OF THE INVENTION

1. Field of the Invention

The present invention relates to a beverage/ice dispensing machine, and more particularly to a beverage/ice dispensing machine that is automatically activated. More particularly, the present invention relates to a touchless automatic fiber optic beverage/ice dispensing machine, which utilizes photoelectric fiber optic technology to activate ice and or beverage dispensing into a cup/container. Automatic dispensing occurs with neither the cup/container nor the person touching the machine in any way, in order to prevent transmitting of germs and diseases from person to person via the beverage/ice dispensing machine. Simplified machine cleaning results from the lack of cup/container push activation levers or push activation buttons or levers.

2. Description of the Related Art

Various types of beverage and ice dispensing machines have been available for some time. It is an extreme concern of health department inspectors that these machines be kept immaculately clean, and that the dispensing nozzles be removed, cleaned, and sterilized each day to kill germs, mold, and bacteria. Due to the moist nozzle surfaces, mold and mildew spreads rapidly. Add to that factor the presence of sugary syrup from soft drinks and other beverages, and the conditions are perfect for an extremely unsafe environment for diseases and germs to be spread from person to person via the beverage/ice dispensing machine.

Presently, these machines either require a user to push an activation button, or push the cup/container against a push activation lever in order to dispense beverages. Similarly, to dispense ice into the cup/container, a user has to push the cup/container against an ice push activation lever, or the user has to push an ice activation bar lever or button. When people push a button to dispense beverages or push an activation bar lever or button for ice, any germs present on the person's hand are now on the machine. The beverage and ice dispensing nozzles are only a few inches below; germs can migrate to these openings and multiply—thereby contaminating the beverages and or ice of future unsuspecting users.

It is common in fast food restaurants with "help yourself" type of beverage stations, for people to push these buttons or levers immediately after handling money at the order counter. After dispensing beverages, people handle french fries and hamburgers etc. while eating, and then return to the drink stations for refills. One can only imagine the diseases and germs on these push buttons and push levers when the person has saliva on their hands from handling food while eating. Add to that the unsanitary scenario of numerous unwashed hands touching the machine.

Beverage and ice cup/container push activation levers are also extremely unsafe. Health department inspectors frown on activation levers contacting the cup/container during refilling. Saliva and the accompanying germs and diseases on the cup/container rim and sides are transmitted to the machine on these lever surfaces. Germs and bacteria simply migrate up the push lever to the beverage and ice dispensing nozzles. Needless to say, the next person to dispense beverages and or ice into their clean cup/container, does not know that their beverage, ice, and cup/container will be contaminated, and their health possibly threatened by contact with diseases.

There have been automatic portion fill type of machines where the cup must sit on the drain grill on a specific spot below the beverage nozzle. Such is the case in U.S. Pat. No. 5,027,284 to Senghaas et al., issued on Jun. 25, 1991. Again, the same unsanitary push buttons for small, medium, large etc. make that design unsafe. In addition, putting a clean cup on the germ laden drain grill is unsanitary. When people get a refill or a beverage is not to their liking, they commonly empty any cup contents on top of the drain grill. Any germs and diseases that person had may now be transmitted to someone's clean cup placed upon this drain grill, resulting in an unsuspecting person possibly contracting unknown germs and diseases.

An ultrasonic type of automatic beverage filling machine, such as U.S. Pat. No. 4,917,155 to Koblasz et al., issued on Apr. 17, 1990, suffers from the same unsanitary drain grill problem, as the clean cup must sit on the dirty, germ infested drain grill below the drink nozzle for automatic filling to take place. This is an unavoidable flaw in that design, as the ultrasonic sensor would send jumbled signals to its control circuitry if the person held their cup—and or moved the cup at all during filling. Placing these ultrasonic sensors so closely together in a dispensing machine would undoubtedly cause interference problems between sensors as multiple drinks are being dispensed. Ultrasonic proximity sensors are known to operate erratically during quick temperature changes, and when in the vicinity of heating and cooling air vents. Erratic operation may also arise from signals ricocheting from adjacent cups, or spilled ice etc. on the drain grill. If an ultrasonic pest repeller device were used in the vicinity, ultrasonic waves of a similar frequency blanketing the dispensing area and combining with these ultrasonic sensor waves, would likely cause erratic operation of the dispensing machine.

Again, for the machine to operate, the cup had to sit on a fixed reference point on the unsanitary drain grill. Mounds of dirty ice emptied from other people's cups may prevent a cup from sitting in the correct spot. Nobody would want to use their hand or clean cup to move another person's dirty ice out of the way. Additional disadvantages are: the impossibility of filling the cup to any desired level, the impossibility of dispensing any number of products into the same cup to create unique mixtures and flavors, and the impossibility of dispensing a drink into the cup if the ice level was above a certain point in the cup.

Likewise, U.S. Pat. No. 4,446,896, to Campagna, issued on May 8, 1984, suffered from the problem of a cup touching an unsanitary, germ ladened drain grill, wherein the cup had to sit in a certain position during filling. Sensor heads were used at various heights corresponding to certain small, medium, or large cups—not allowing the freedom of obtaining proper filling while using any size cup at any time. Additional disadvantages are: the impossibility of filling the cup to any desired level, and the impossibility of dispensing any number of products into the same cup to create unique mixtures and flavors.

It is an object of the present invention to provide a touchless automatic fiber optic beverage/ice dispenser; one that is automatically activated by photoelectric fiber optic technology, without the person or cup/container touching the dispensing machine in any way, while preserving normal filling positioning with which the person is already accustomed—in order to prevent the spreading of germs and diseases from person to person via the dispensing machine.

SUMMARY OF THE INVENTION

The present invention is a touchless automatic fiber optic beverage/ice dispenser. Briefly stated, in accordance with one aspect of the present invention, a beverage/ice dispensing machine is provided for sanitary dispensation of products without the person or cup/container touching any part of the machine, to avoid germ and disease transmission from person to person via the dispensing machine. The beverage/ice dispensing machine includes a support structure optionally including a forwardly extending base which incorporates a drain with drain grill, and an upwardly extending front backdrop—the backdrop being the front wall of the dispensing machine housing cabinet. Optionally, above the backdrop are located one or more beverage dispensing heads, and one or more ice chute members to dispense ice into a cup/container, from the ice hopper area inside the cabinet enclosure.

In accordance with another aspect of the present invention, automatic dispensing activation is provided based upon the presence or absence of a cup/container in an area below a dispensing nozzle, as detected by electronic proximity sensor circuitry, including, but not limited to photoelectric type of fiber optic technology, which activates control circuitry to achieve touchless automatic product dispensation.

In accordance with a further aspect of the present invention, a beverage/ice dispenser is provided wherein any size cup/container is held in normal fashion below a beverage or ice dispensing nozzle to receive product flow, as touchless automatic dispensing ensues. Any number of products in various desired volumes may be dispensed to any level within the cup/container, to achieve customized mixtures as per user's taste.

In accordance with a still further aspect of the present invention, a beverage/ice dispenser is provided that includes a filling indicator light corresponding to each product to be dispensed, signaling to the user that touchless automatic product dispensing is taking place.

In accordance with a yet still further aspect of the present invention, a touchless automatic beverage/ice dispenser is provided that includes lit fiber optic terminations below each of the beverage and or ice dispensing nozzles, guiding a user to hold the cup/container under the desired product dispensing nozzle to obtain product dispensation.

In accordance with an even further aspect of the present invention, a touchless automatic beverage/ice dispenser is provided that includes an "on/off" mode selector control, to prevent undesired automatic product flow during machine cleaning, and to prevent unauthorized product dispensation.

In accordance with a yet further aspect of the present invention, a touchless automatic beverage/ice dispenser is provided wherein machine cleaning is greatly simplified, due to the streamlined design without cup/container push activation levers, or push activation buttons or levers.

In accordance with an even yet further aspect of the present invention, a beverage/ice dispenser is provided that enables a user to enjoy touchless automatic product dispensing activation in an effortless, sanitary manner, in which germs and diseases are not transmitted from person to person via the dispensing machine.

DESCRIPTION OF THE PREFERRED EMBODIMENTS

Figure 1:
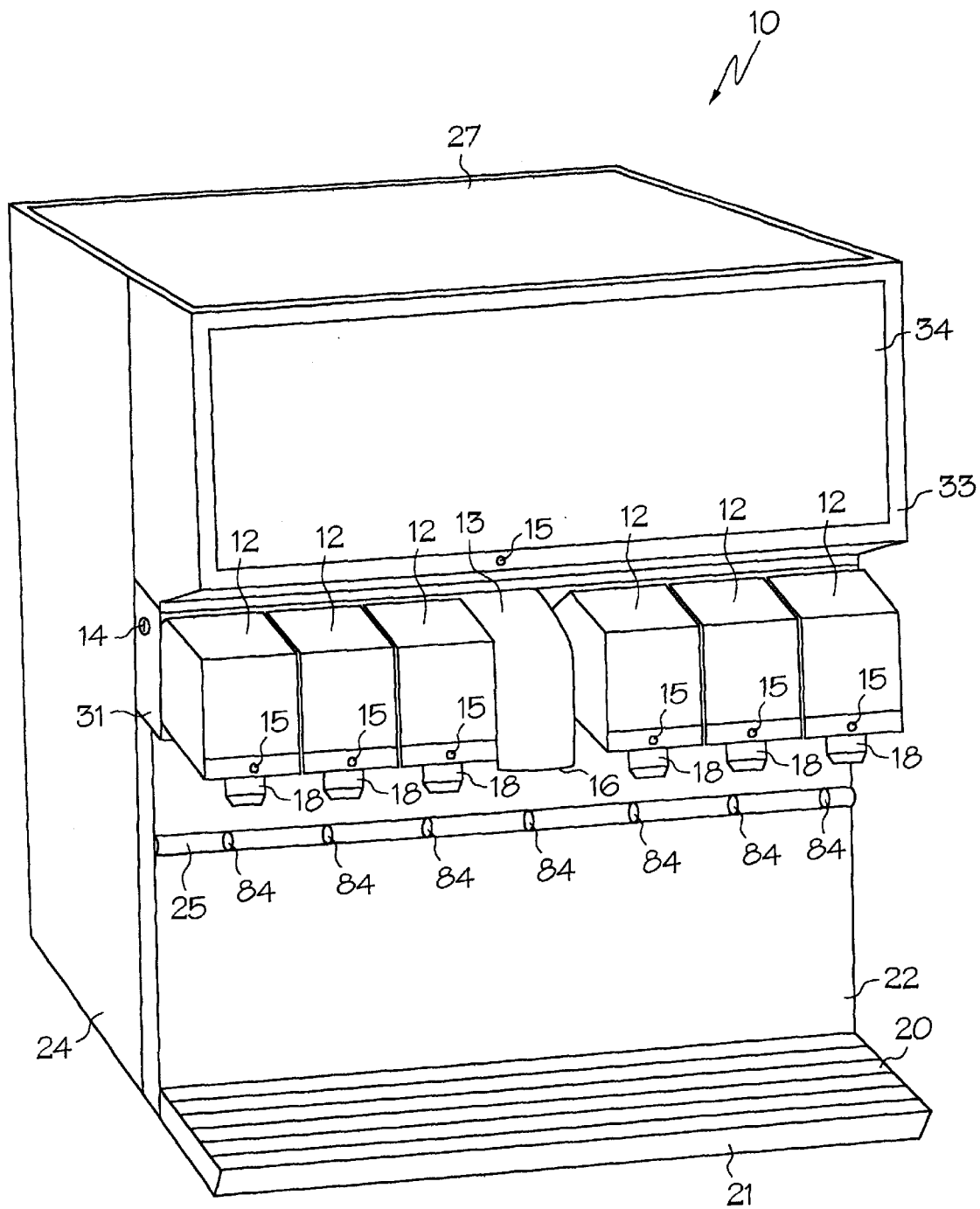
FIG. 1 is a front perspective view of a touchless automatic fiber optic beverage/ice dispenser in accordance with the present invention.
Figure 2:
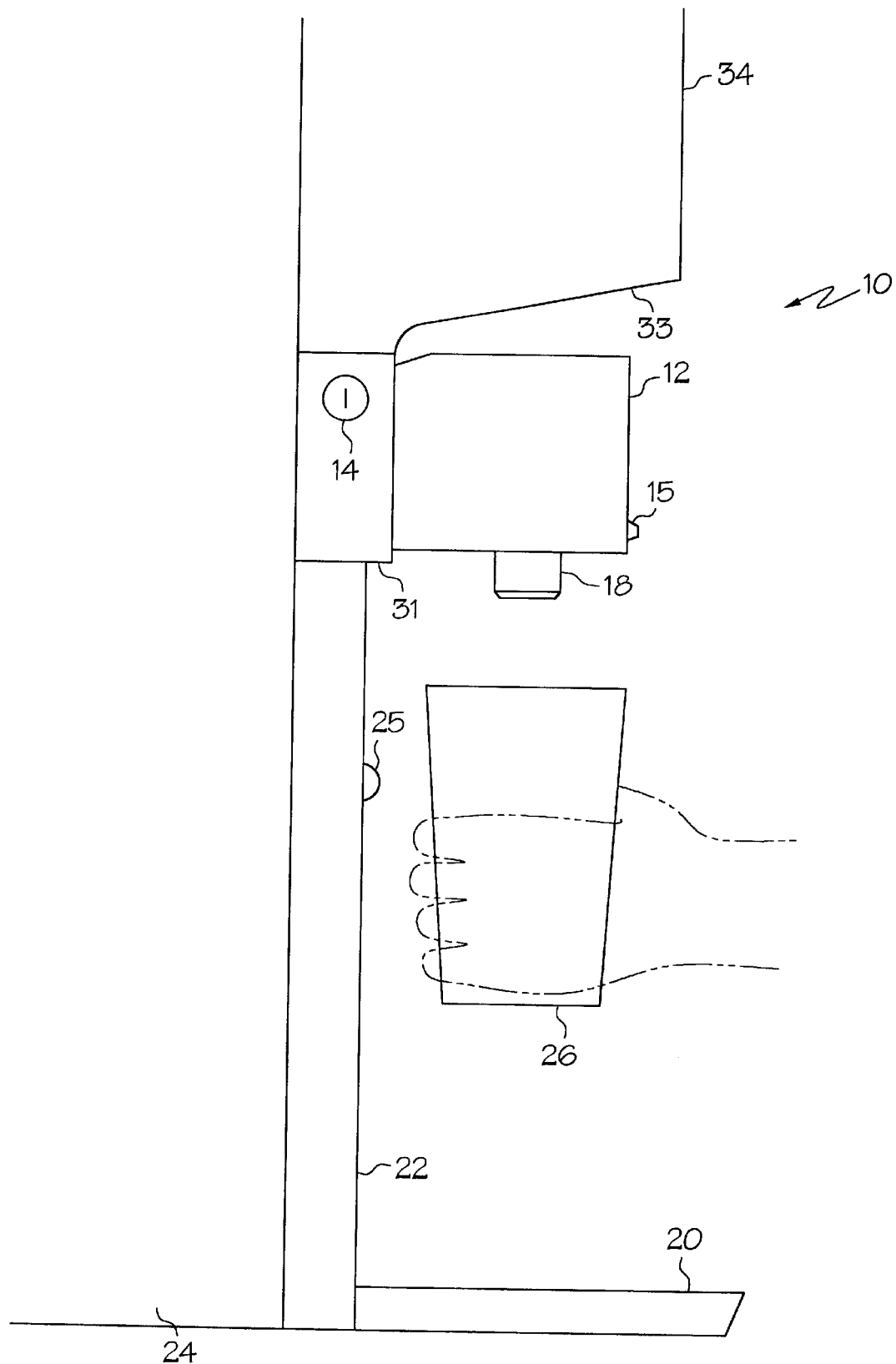
FIG. 2 is a partial side elevational view of the touchless automatic fiber optic beverage/ice dispenser shown in FIG. 1 with a cup/container in normal filling position for beverage dispensing.
Figure 4:
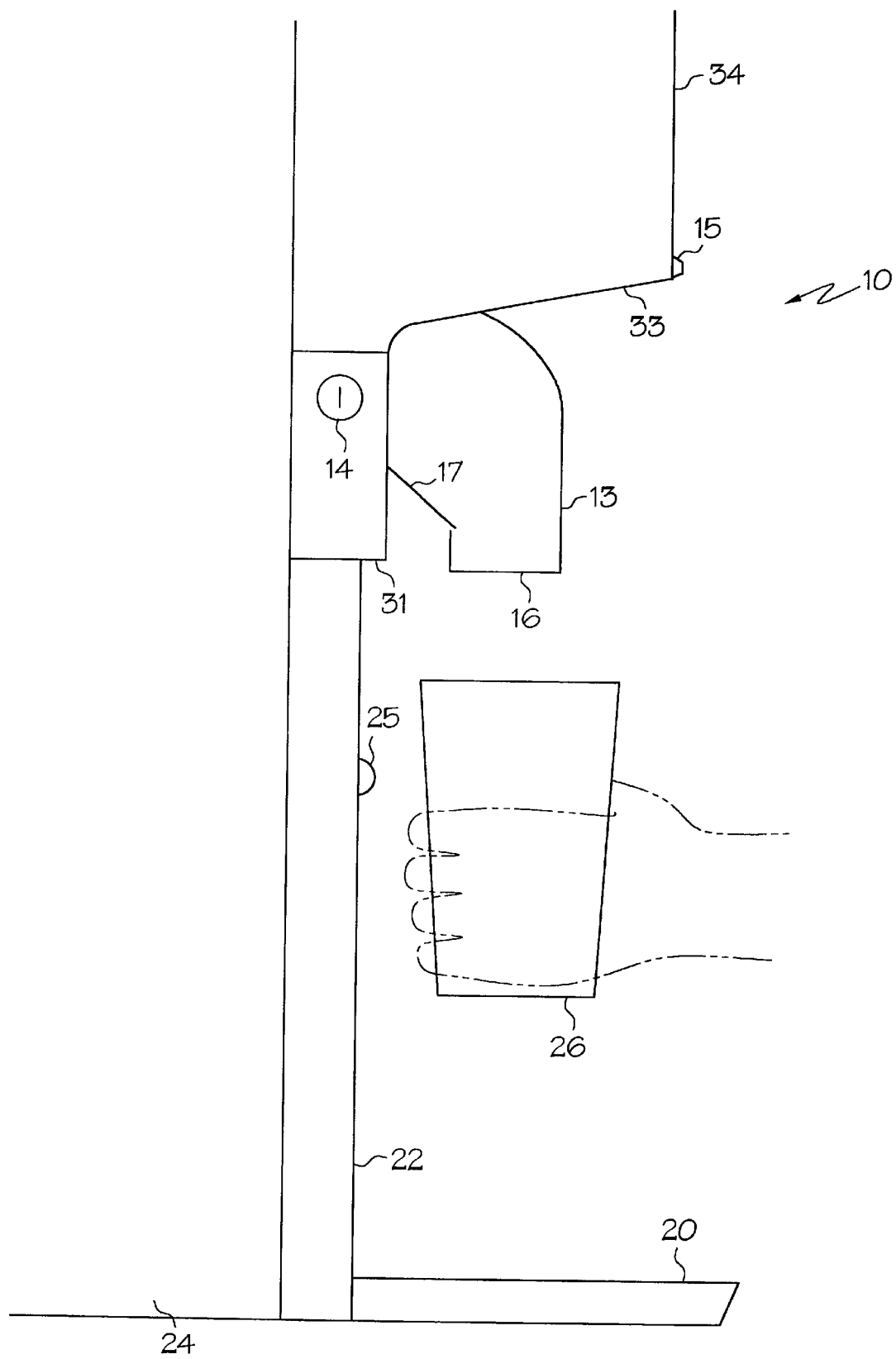
FIG. 4 is a partial side elevational view of the touchless automatic fiber optic beverage/ice dispenser shown in FIG. 1 with a cup/container in normal filling position for ice dispensing.

Referring now to the drawings, and particularly to FIGS. 1, 2, and 4 thereof, there is shown a touchless automatic fiber optic beverage/ice dispenser 10 in accordance with the present invention. Touchless automatic product dispensation is achieved by photoelectric fiber optic detection of a cup/container 26 (See FIG. 2 and FIG. 4), being held in an area below a desired beverage dispensing nozzle 18, or an ice dispensing nozzle 16, on touchless automatic fiber optic beverage/ice dispenser 10 (See FIG. 1).

Users enjoy effortless, completely sanitary, user friendly beverage and or ice dispensing while holding their cup/container in a normal fashion to which they are currently accustomed. Sanitary qualities of dispensing machine 10 are a result of touchless activation design, in which neither the person nor cup/container 26 (See FIG. 2 and FIG. 4) touches the machine in any way; germs and diseases cannot be spread from person to person via dispensing machine 10 (See FIG. 1).

A filling indicator light 15 (See FIG. 1) visually signals to the user that product dispensation is occurring from the respective dispensing nozzle to which that light corresponds. A horizontal front lense piece 25 allows fiber optic light as transmitted through a clear optical rod 84 to guide the user in holding cup/container 26 (See FIG. 2 and FIG. 4) below one of desired product dispensing nozzles 16, 18 (See FIG. 1). An "on/off" mode selector control 14 allows easy dispensing machine cleaning without undesired automatic product flow occurring, and prevents unauthorized product dispensation. The uncluttered streamlined appearance of this touchless automatic activation design eliminates cup/ container push activation levers and push buttons and levers. Fewer surfaces to clean as well as easy accessibility to a front backdrop 22 (See FIG. 1), allows easier machine cleaning in far less time, saving much cost and labor.

Dispensing machine 10 includes a support structure, including optional leg members (not shown), also optionally including a forwardly extending base 21 in which is located a drain grill 20 (See FIG. 1); the dispensing machine also includes upwardly extending front backdrop 22, which also serves as the front of the dispensing machine cabinet. Optionally above the upper portion of front backdrop 22 are a number of beverage dispensing heads 12 and an ice chute assembly member 13, below which are beverage dispensing nozzles 18, and ice dispensing nozzle 16, respectively. Filling indicator lights 15 located on each beverage dispensing head 12, and on an upper front cover 33 above ice chute assembly member 13, illuminate respectively during product dispensing, to signal to the user that touchless automatic product filling is occurring. Filling indicator lights 15 also help familiarize the user with the concept that merely holding their cup/container 26 (See FIG. 2 and FIG. 4) below any desired dispensing nozzle, causes automatic product dispensing, respectively, from that particular nozzle.

Above beverage dispensing heads 12 and ice chute assembly member 13 (See FIG. 1) is a front panel illuminated graphics area 34, installed in upper front cover 33, for advertising various products being dispensed, as well as for decorative purposes. A set of side enclosure panels 24, an optional top panel (not shown), and an ice hopper filling lid 27, form the remainder of the dispensing machine cabinet enclosure. Ice is manually placed in an ice hopper area 32 (See FIG. 3 and FIG. 5) after removing ice hopper filling lid 27. Alternatively, an automatic ice-making machine (not shown) is placed above dispensing machine 10, to constantly replenish ice hopper area 32. Ice from ice hopper area 32 is delivered to an ice gate 70 by an ice agitator motor 71 (See FIG. 7) connected to a rotating ice delivery system (not shown), located in the lower portion of ice hopper area 32 of dispensing machine 10, when touchless automatic ice dispensing is activated. A cold plate (not shown), or equivalent component for cooling, is located in a cold plate area 45 below ice hopper area 32, through which a set of beverage delivery lines (not shown) travel—thereby cooling beverage liquids on their way to a beverage valve 68 (See FIG. 3), or a set of beverage valves.

Below beverage dispensing nozzles 18 and ice dispensing nozzle 16, is located drain grill 20 (See FIG. 1) above a drain (not shown) in base 21, for the purpose of draining away beverages and or melting ice that spilled or was emptied onto the drain grill, as well as water from melting ice in ice hopper area 32. "On/off" mode selector control 14 optionally including a key switch, located on the side end of a soffit piece 31, disconnects 12 v DC positive power from a power supply 50 to a relay control module 86 (See FIG. 8), to which are connected electronic sensing and control circuitry components (See FIG. 6 and FIG. 7), preventing undesired product flow from dispensing nozzles 16 and 18 during machine cleaning and when product dispensation is unauthorized for any reason.

Fiber Optic Sensing

Figure 3:
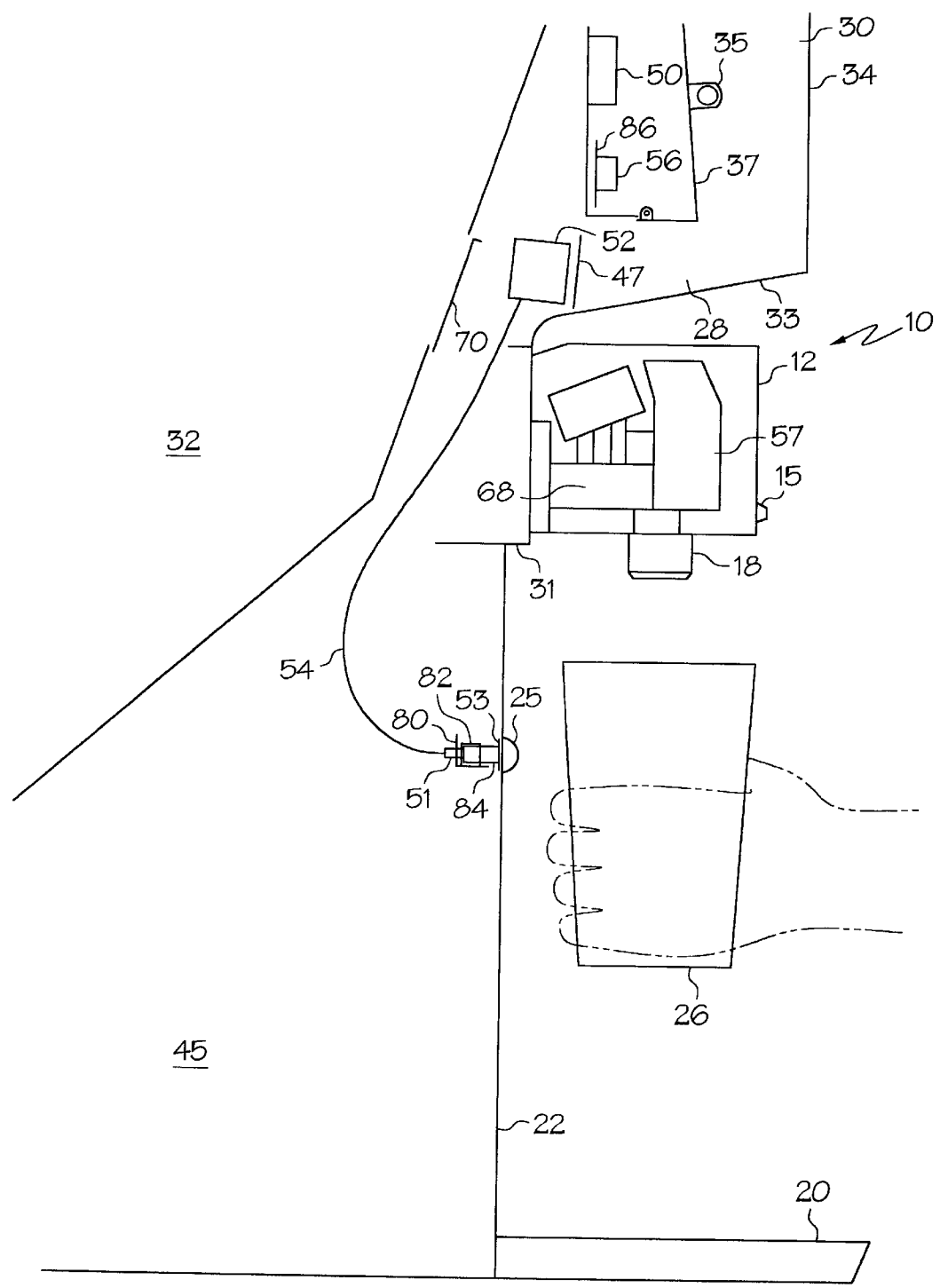
FIG. 3 is a partial side cross sectional view of the touchless automatic fiber optic beverage/ice dispenser shown in FIG. 1, showing electronic sensing and control circuitry components for touchless automatic beverage dispensing.

Cup/container 26 is shown as it would be held in a sensing area below beverage dispensing nozzle 18 (See FIG. 2). In FIG. 3, a partial cross section of dispensing machine 10 shows the locations of electronic sensing and control circuitry components involved in activating touchless automatic product dispensing, when cup/container 26 is located in an area to receive product filling. Behind front illuminated panel 34, is a light box area 30 inside upper front cover 33 (See FIG. 3 and FIG. 5), containing a fluorescent light fixture 35, which is mounted to a hinged electrical box 37. Located behind upper front cover 33, electrical box 37 houses the various wiring and electrical parts necessary for the operation of dispensing machine 10, including power supply 50 with its supply adapter transformer, fill relays 56 (electronic control components) for touchless automatic activation, and an ice agitator timer 75. Below electrical box 37 is a lower recess area 28, also inside upper front cover 33, housing a number of fiber optic amplifiers 52 shielded with a polycarbonate amplifier cover 47, and a number of optical fiber units 54; one amplifier and optical fiber unit senses cup/container 26 (See FIG. 3 and FIG. 5) in a given area for filling. Removing upper front cover 33 allows easy front access to these electronic sensing and control circuitry components for installation and or repair purposes.

Figure 5:
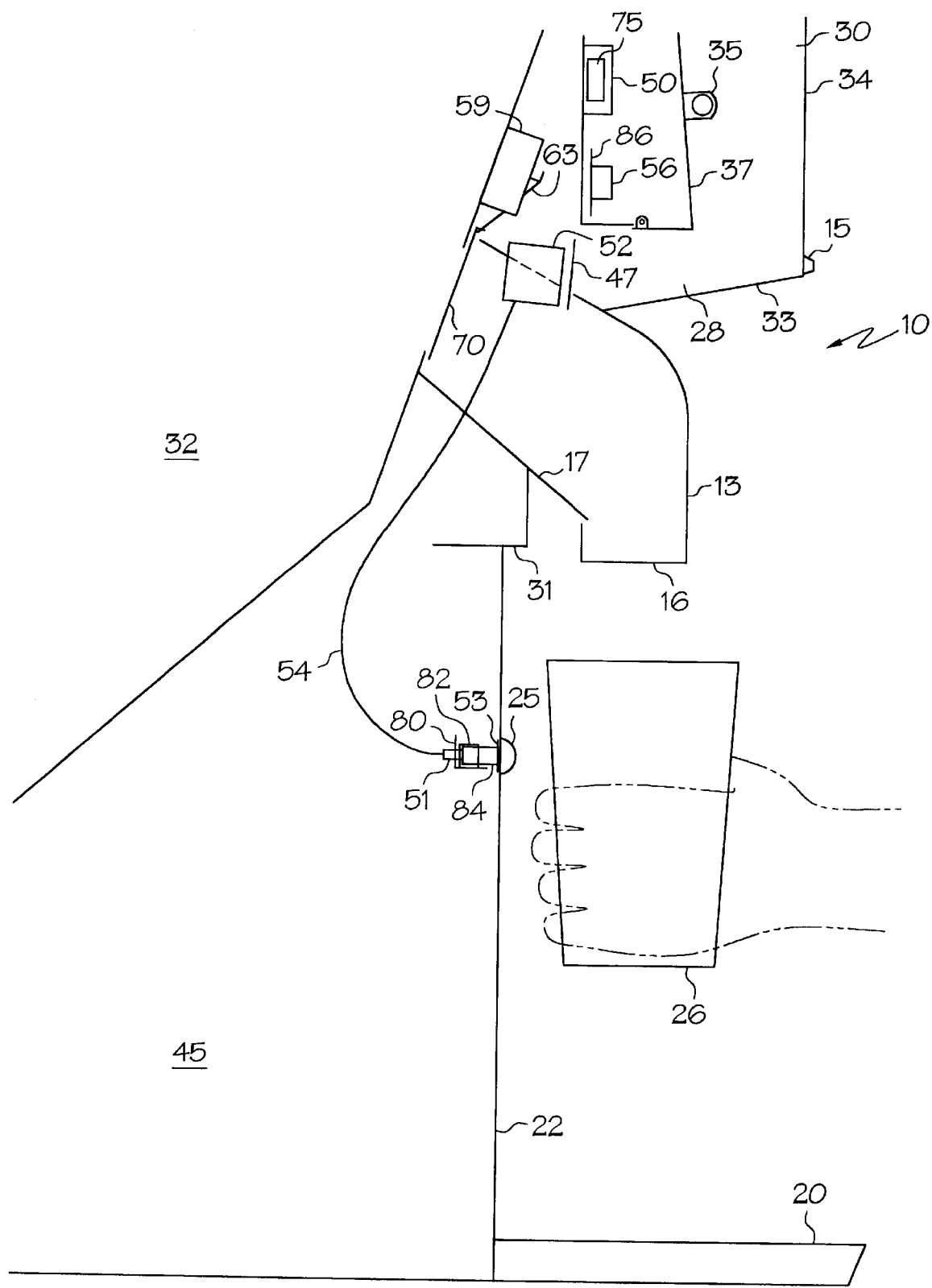
FIG. 5 is a partial side cross sectional view of the touchless automatic fiber optic beverage/ice dispenser shown in FIG. 1, showing electronic sensing and control circuitry components for touchless automatic ice dispensing.

See FIG. 3 and FIG. 5 for the following component descriptions. Power supply 50 provides 12 v DC filtered, regulated power to fiber optic amplifier 52 and fill relay 56. A single "Altronix" brand, #AL624 power supply (with its 110 v AC to 16.5 v AC 20 VA supply adapter transformer) located in electrical box 37, is used to power as many fiber optic amplifier and fill relay sets as are needed for a multiple product dispensing machine. The maximum output current of this power supply is 1.2 amps—enough to supply power to the electronic sensing and control components of a dispensing machine with a large bank of product dispensing nozzles 16 and 18. A power supply with greater amperage output may be used, if needed, for an even larger dispensing machine. FIG. 1 shows a six beverage dispensing machine with one ice dispenser; a total of seven products are dispensed, necessitating seven sets of fiber optic amplifiers 52 and fill relays 56 (See FIG. 3 and FIG. 5)—a set comprising one amplifier (with optical fiber unit 54) and one relay per product being dispensed.

The fiber optic amplifier is an "Omron" brand type E3X-DA41 photoelectric switch, to which is attached an "Omron" brand type E32-DC200 diffuse plastic optical fiber unit. For beverage dispensing (See FIG. 3) and ice dispensing (See FIG. 5), optical fiber unit 54 then proceeds downward through the cavity behind soffit piece 31.

An optical fiber termination end 51 (See FIG. 3 and FIG. 5) is affixed to an "L" channel 80 which horizontally traverses the width of the dispensing machine immediately behind front backdrop 22. "L" channel 80 is affixed by brackets (not shown) and spacers (not shown) to left and right cabinet side enclosure panels 24 (See FIG. 1). A holding bracket 82 secures clear optical rod 84 to "L" channel 80 and holds the rear end of the rod in such a position that it touches optical fiber termination end 51 (See FIG. 3 and FIG. 5). Clear optical rod 84 is made of acrylic (or equivalent), about 9.525 mm (⅜ inch) in diameter, about 22.225 mm (⅞ inch) in length, and is translucently frosted on both ends to diffuse light passing through it.

Horizontal front lense piece 25 (See FIG. 1 and FIG. 3 and FIG. 5) traverses the width of front backdrop 22 on the front side with its center being about 85.725 mm (3⅜ inches) below the forwardly protruding overhang of soffit piece 31, for proper sensing of cup/container 26 in a filling area below one of product dispensing nozzles 16 and 18. Horizontal front lense piece 25 is made of clear acrylic (or equivalent), solid half-round rod about 19.05 mm (¾ inch) in diameter, and is affixed and sealed to front backdrop 22 to prevent any liquids from entering. Opposite each clear optical rod 84 is an O-ring 53 affixed to the rear of front backdrop 22, to help guide the front end of each optical rod through a circular hole in the front backdrop as the backdrop is being installed on the dispensing machine. When front backdrop 22 is installed, the front end of clear optical rod 84 touches the rear of horizontal front lense piece 25. With this design, correct sensing of cup/container 26 is achieved, while extraneous splatters etc. that may be on the surface of horizontal lense piece 25 do not hinder operation.

Each of optical fiber termination ends 51 and clear optical rods 84 are affixed to "L" channel 80 in a horizontal position, perpendicular to vertical front backdrop 22. Horizontal spacing is such that these components are centered below each respective product dispensing nozzle 16, 18 (See FIG. 1). It should be noted that for beverage dispensing head 12, ice chute assembly member 13, and fixed ice chute rear half 17 removal during servicing, these components are not disturbed in any way. Likewise, when front backdrop 22 is removed for servicing, neither "L" channel 80 nor any components affixed to it are disturbed—easy servicing results.

Flexibility of optical fiber unit 54 and tiny size of termination end 51 make fiber optic technology perfect for touchless automatic beverage/ice dispensing machine use. Neither fiber optic amplifiers 52 with their optical fiber units 54, nor the respective sensing areas below dispensing nozzles 16 and 18, interfere in any way with each other; perfect touchless automatic activation results.

The optical fiber unit is a double fiber type in which the first fiber conducts pulsed light from amplifier 52 to be emitted from termination end 51 of the fiber. The presence of cup/container 26 within an area below one of beverage dispensing nozzles 18 or ice dispensing nozzle 16, will cause a portion of this pulsed light signal to be reflected off of the cup/container surfaces, back to termination end 51 of optical fiber unit 54. The second fiber of optical fiber unit 54 then conducts this reflected light signal back to fiber optic amplifier 52.

Amplifier internal circuitry then activates an internal PNP type of switching control output connecting power to energize the coil of fill relay 56 when cup/container 26 is located in filling position below one of dispensing nozzles 16 or 18, and disconnecting power to de-energize the coil of fill relay 56 when cup/container 26 is no longer in filling position.

Fiber optic proximity sensing components as used in the present invention, are by far the most sensitive type of technology to sense the leading edge of cup/container 26, enabling fast, accurate, touchless automatic activation. It is understood in the present invention of touchless automatic fiber optic beverage/ice dispenser 10 (See FIG. 1), that one product will be dispensed from one beverage dispensing nozzle or one ice dispensing nozzle at a time into cup/container 26 by the cup/container being located below that respective dispensing nozzle; however, a total of as many products desired in any volumes desired, may be dispensed into cup/container 26, allowing user total control over dispensing of their beverage and or ice mixture.

Fiber optic amplifier 52 sensitivity level adjustment setting and clear optical rod 84 in conjunction with horizontal front lense piece 25 arrangement (See FIG. 3 and FIG. 5), prevents cup/container 26 from being detected as the cup/container is brought into filling position until the top opening of the cup/container is sufficiently below one of dispensing nozzles 16 or 18. Product will only flow into the cup/container when it is in filling position, preventing undesired flow over the outside surfaces of cup/container 26. Likewise, as the cup/container is being removed from the filling area, product flow will stop while the top opening of the cup is still sufficiently below that dispensing nozzle—preventing undesired flow over the outside surfaces of the cup/container as it is being withdrawn. Fast fiber optic amplifier switching speed allows fast start and stop product filling action.

A diffuse plastic type of optical fiber unit 54 was chosen so that the light emitting and receiving fibers would be together as one optical fiber unit from amplifier 52 to optical fiber termination end 51. Plastic optical fibers are easily cut to any custom length required, facilitating a simple, neat installation. This diffuse optical fiber design needs no special optical reflectors or remote receiving fibers, and is perfectly suited for the touchless automatic fiber optic beverage/ice dispenser as in the present invention.

Touchless Automatic Beverage Dispensing Activation and Schematic

Figure 6:
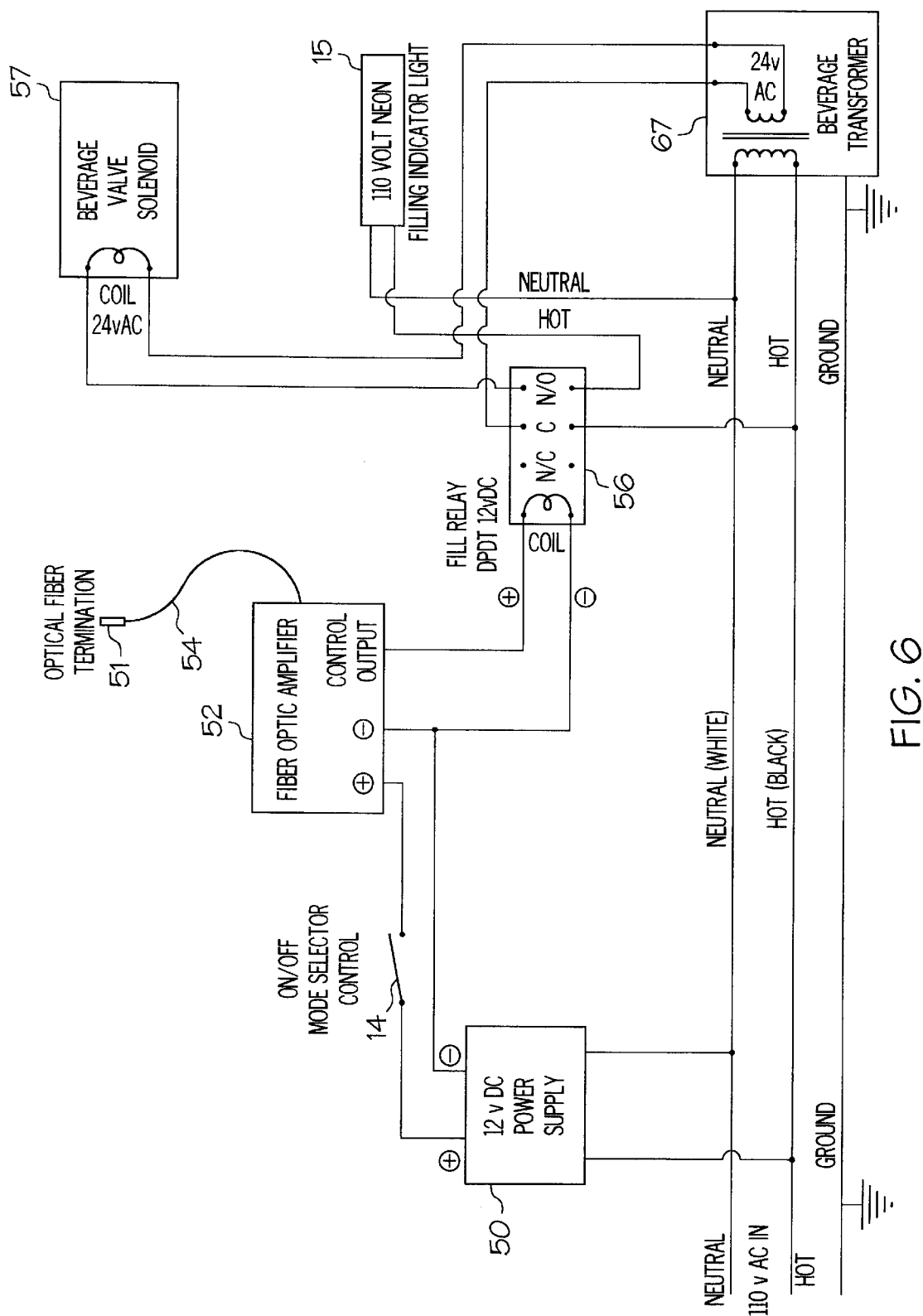
FIG. 6 is a schematic diagram showing wiring connections of electronic sensing and control components and beverage dispensing actuators for the touchless automatic fiber optic beverage/ice dispenser in accordance with the present invention.

Schematic FIG. 6 shows the electronic sensing and control components as connected to activate beverage valve solenoid 57 and filling indicator light 15, for beverage dispensation to occur. 110 v AC hot and neutral (in lower left corner) energize 12 v DC power supply 50 and a beverage transformer 67 when power is supplied to the dispensing machine. Note: only one fiber optic amplifier 52 and one fill relay 56 is shown in FIG. 6 for clarity, to explain touchless automatic activation for one beverage. Connections are made via relay control module 86 (See FIG. 8) which incorporates all fill relays 56.

"On/off" mode selector control 14 switches the 12 v DC positive from filtered, regulated power supply 50 to all fiber optic amplifiers 52. When in the "on" position, 12 v DC positive is connected (12 v DC negative being always connected to the fiber optic amplifiers and the fill relays)—to allow touchless automatic activation. When in the "off" position, 12 v DC positive is disconnected—and fiber optic amplifiers 52 and fill relays 56 receive no power, preventing touchless automatic activation from occurring for easy machine cleaning and to prevent unauthorized product dispensation.

Fiber optic amplifier 52 incorporates a PNP type of switching control output, which when set to the "light on" mode, provides positive to the coil of DPDT 12 v DC fill relay 56, when cup/container 26 (See FIG. 2 and FIG. 3) is in an area below beverage dispensing nozzle 18 for beverage filling—as sensed through optical fiber termination end 51 of optical fiber unit 54 (connected to fiber optic amplifier 52). Fill relay 56 coil negative is always connected.

When DPDT fill relay 56 coil is energized, 24 v AC output from 110 v AC input beverage transformer 67 is connected through one set of relay common (C) and normally open (N/O) contacts—thereby energizing beverage valve solenoid 57. Beverage valve 68 (See FIG. 3) then opens allowing beverage to exit beverage dispensing nozzle 18 to fill cup/container 26. The other common (C) and normally open (N/O) fill relay 56 contacts connect hot to 110 volt neon filling indicator light 15 (neutral is always connected), causing it to illuminate during beverage filling. When cup/container 26 is withdrawn from the beverage filling area, fiber optic amplifier 52 control output ceases, causing the coil of fill relay 56 to de-energize. Both sets of common (C) and normally open (N/O) relay contacts open, causing beverage valve solenoid 57 to de-energize, thereby allowing beverage valve 68 to close (stopping beverage flow)—and causing filling indicator light 15 to go off by disconnecting its hot supply.

Touchless Automatic Ice Dispensing Activation and Schematic

Figure 7:
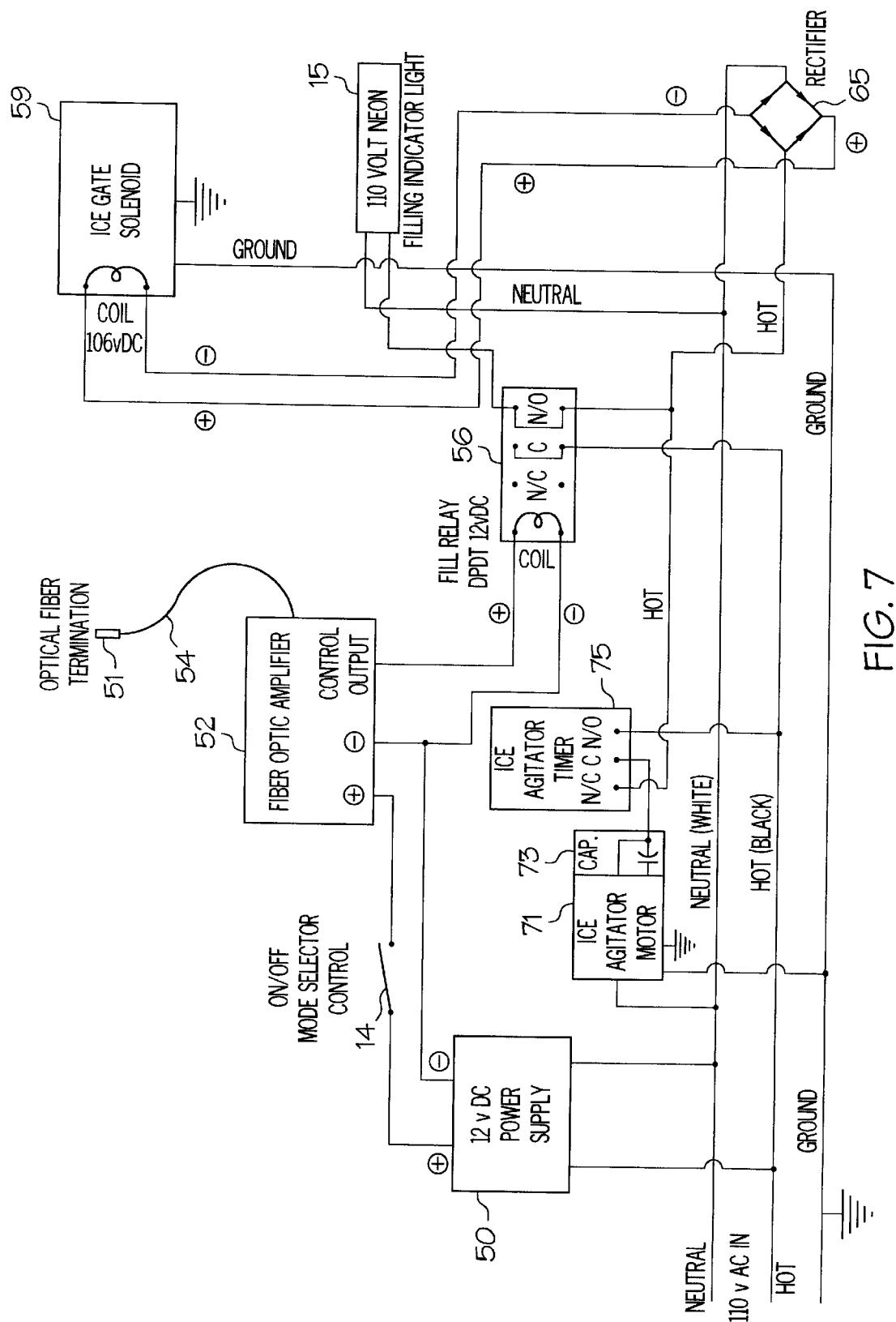
FIG. 7 is a schematic diagram showing wiring connections of electronic sensing and control components and ice dispensing actuators for the touchless automatic fiber optic beverage/ice dispenser in accordance with the present invention.

Schematic FIG. 7 shows the same electronic sensing and control components (with one fiber optic amplifier 52 and one fill relay 56) wired in the same manner as in FIG. 6, only ice gate solenoid 59, ice agitator motor 71, and filling indicator light 15 are activated for ice dispensation to occur. "On/off" mode selector control 14 is connected in the same manner in series in the 12 v DC positive from filtered, regulated 12 v DC power supply 50 to fiber optic amplifier 52, and performs the same function of preventing undesired automatic product flow during machine cleaning and to prevent unauthorized product dispensation.

Fiber optic amplifier 52 again incorporates a PNP type of switching control output, which when set to the "light on" mode, provides positive to the coil of DPDT 12 v DC fill relay 56 when cup/container 26 (See FIG. 4 and FIG. 5) is in an area below ice dispensing nozzle 16 for ice filling—as sensed through optical fiber termination end 51 of optical fiber 54 (connected to fiber optic amplifier 52). Fill relay 56 coil negative is always connected.

When DPDT fill relay 56 coil is energized, relay common (C) and normally open (N/O) contacts connect hot to a rectifier 65 and filling indicator light 15—causing it to illuminate during ice filling. 110 v AC input rectifier 65 has an output of 106 v DC which energizes ice gate solenoid 59, causing ice gate 70 to open by action of lever 63. (See FIG. 7 and FIG. 5). While ice gate 70 is open, ice from ice hopper area 32 is propelled by ice agitator motor 71 connected to a rotating ice delivery system (not shown), flowing downwardly through ice chute assembly member 13 and fixed ice chute rear half 17, and exiting through ice dispensing nozzle 16 into cup/container 26.

The common (C) and normally open (N/O) fill relay 56 contacts also connect hot to the normally closed (N/C) relay contact of ice agitator timer 75. (See FIG. 7 and FIG. 5). Hot then goes from the common (C) relay contact to a capacitor 73, which is connected to ice agitator motor 71—(neutral being always connected to the ice agitator motor). DPDT fill relay 56 contacts are more than adequately rated to handle the rated current starting draw of approximately 4 amps when ice agitator motor 71 starts, and ice gate solenoid 59 is energized, since both common (C) terminals are connected and both normally open (N/O) terminals are connected, to divide the load evenly between the fill relay contacts, for durability.

When cup/container 26 is withdrawn from the ice filling area, fiber optic amplifier 52 control output ceases, causing the coil of fill relay 56 to de-energize. Both sets of common (C) and normally open (N/O) relay contacts open, causing ice gate solenoid 59 to de-energize, thereby allowing ice gate 70 to close (stopping ice flow)—and causing filling indicator light 15 to go off by disconnecting its hot supply. Likewise, ice agitator motor 71 is de-energized, causing the rotating ice delivery system (not shown) to stop.

Ice agitator timer 75 periodically automatically causes ice agitator motor 71 to stir the ice in ice hopper area 32, preventing it from clumping together in large masses. 110 v AC hot is connected to the normally open (N/O) relay contact of ice agitator timer 75, and when the relay is energized periodically by the timer, hot is then connected to the common (C) relay contact—hot thereby is connected to capacitor 73, energizing ice agitator motor 71 for the duration of timeout of ice agitator timer 75. (See FIG. 7).

It is an important design feature that fiber optic amplifier 52 is isolated by filtered, regulated power supply 50 on the supply side, and is isolated by fill relay 56 on the output side. By this design, voltage ripples, spikes, or transients etc. are eliminated on the supply side before reaching fiber optic amplifier 52; and, fill relay 56 acts as a buffer on the output side between fiber optic amplifier 52 and either beverage valve solenoid 57, or ice gate solenoid 59 and ice agitator motor 71, respectively. Long fiber optic amplifier life and excellent performance results.

Figure 8:
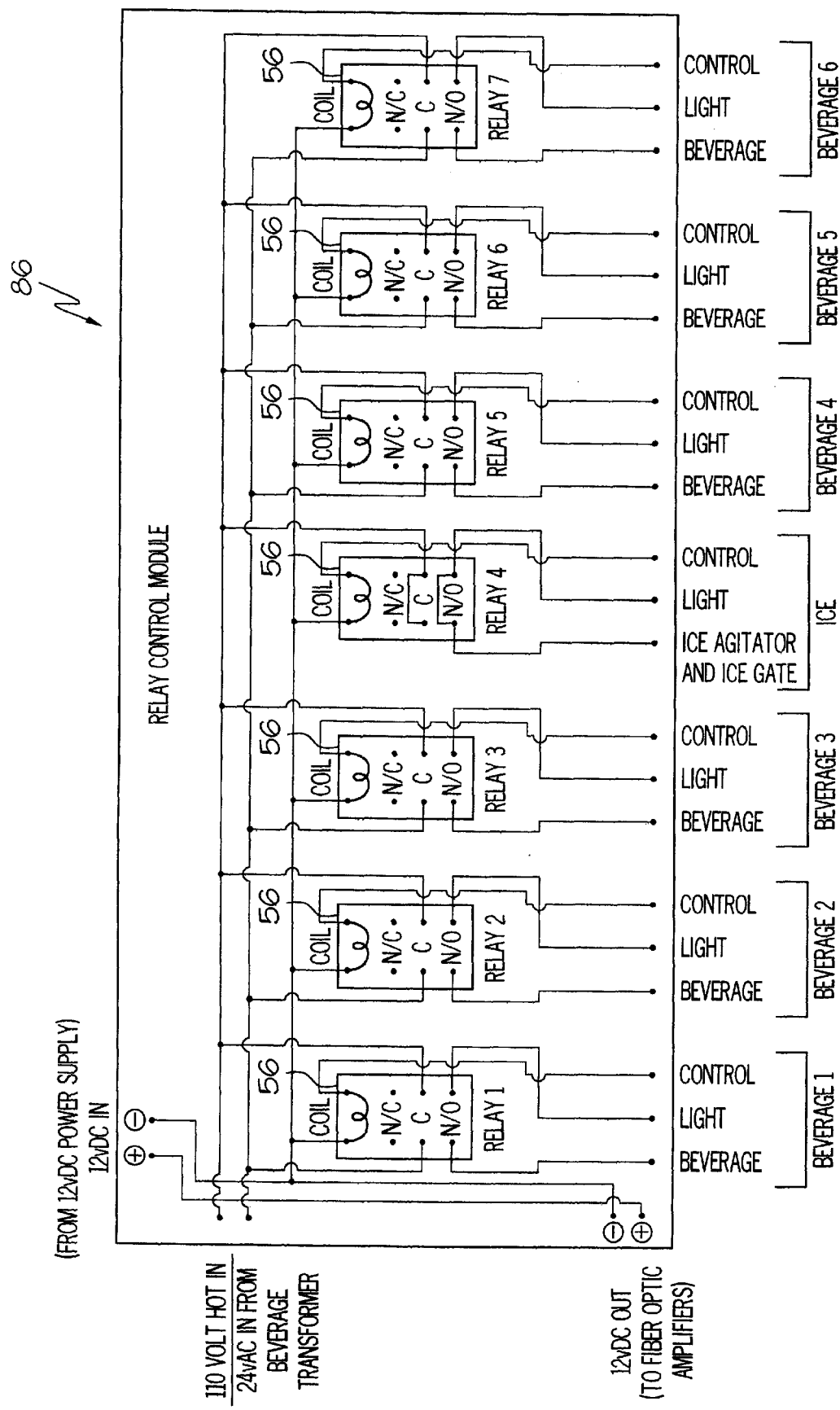
FIG. 8 is a schematic diagram showing wiring connections and circuit board arrangement of relay control components of a relay control module for the touchless automatic fiber optic beverage/ice dispenser in accordance with the present invention.

It should be noted that in touchless automatic fiber optic beverage/ice dispenser 10 (See FIG. 1), a bank of six beverage dispensing heads 12 and one ice chute assembly member 13 constitutes seven products being dispensed. Seven sets of fiber optic amplifiers 52 and fill relays 56, wired respectively as shown in FIG. 6 and FIG. 7 and FIG. 8 (with the relays mounted on relay control module 86) are necessary—all deriving power from only one 12 v DC power supply 50. In such a touchless automatic dispensing machine incorporating any number of beverage dispensing heads 12 and or ice chute assembly members 13, a set of electronic sensing and control components is included for each product being dispensed.

Electronic Module Component Locations and Connections

The electronic sensing circuitry and control components are easily accessible for installation and or service. Only one power cord enters touchless automatic fiber optic beverage/ice dispenser 10 (See FIG. 1) in normal fashion—all touchless automatic circuitry connections are inside.

By simply removing upper front cover 33 (See FIG. 3 and FIG. 5) and opening the hinged front half of electrical box 37, 12 v DC filtered, regulated power supply 50 with its 110 v AC to 16.5 v AC 20 VA supply adapter transformer—and all fill relays 56 on relay control module 86 are easily accessed, along with ice agitator timer 75. Ice agitator timer 75 has quick connect push on terminals, while electrical circuit board screw connection terminals on power supply 50 and relay control module 86 enable quick, secure wiring connections to be made.

Relay control module 86 (See FIG. 8) contains all fill relays 56 with corresponding groups of three screw connector terminals (across lower edge), in line—respectively left to right, as they control the various dispensed products (left to right) below, on dispensing machine 10 (See FIG. 1). Logical, easy servicing results from this design. The left screw connector terminal of the beverage groups feeds 24 v AC from beverage transformer 67 to one of beverage valve solenoids 57 for dispensing of that particular desired beverage. For ice dispensation, the left screw connector terminal feeds ice agitator motor 71 through capacitor 73 and ice agitator timer 75 terminals, and ice gate solenoid 59 through rectifier 65. For both beverage and ice wiring, the other lead is always connected to complete the circuit. Each center screw connector terminal feeds hot 110 v AC to neon filling indicator light 15 when that particular product is being dispensed; the neutral lead being always connected. Each right screw connector terminal receives the control output from each respective fiber optic amplifier 52 to energize the coil of its fill relay 56, for dispensation of that particular product; fill relay 56 coil negative being always connected. For maximum durability, contacts of fill relays 56 have a much higher amperage rating than needed for these electrical loads.

At the top left of relay control module 86 (See FIG. 8) positive and negative 12 v DC is received from power supply 50, being connected by screw connector terminals. At the upper left side of the relay control module, the upper screw connector terminal receives hot 110 v AC, while the lower terminal receives one lead of 24 v AC from beverage transformer 67. At the lower left of relay control module 86, all fiber optic amplifier 52 power wires connect to positive and negative 12 v DC screw connector terminals, in order to energize the amplifiers. Fast servicing in the field results from replacement of the entire relay module board—leaving individual relay testing to a service facility.

All fiber optic amplifiers 52 (connected to their respective optical fiber units 54) are located on a single DIN rail mounting track (not shown) in front lower recess area 28 behind cover 47 (See FIG. 3 and FIG. 5). Should fast fiber optic amplifier 52 service in the field ever be necessary, simply disconnect optical fiber units 54 (leaving fibers in place), and the amplifier wiring at screw connector terminals on relay control module 86. Remove the DIN rail (with all amplifiers 52) as one module—for fast easy replacement leaving individual amplifier testing to a service facility. These "Omron" type of fiber optic amplifiers are extremely durable. They have an expected life rating of 10 plus years when used on product manufacturing/assembly lines of factories, enduring constant fast switching 24 hours a day, 7 days a week, year in and year out. Fiber optic amplifier 52 lifetime as used in touchless automatic fiber optic beverage/ice dispenser 10 (See FIG. 1) would be much longer. Commercial durability is thus ensured.

Filling indicator lights 15 are neon indicator lamps for extremely long life and durability, and are disconnected quickly through use of "Molex" brand pin plug connectors. Covers of beverage dispensing heads 12 have an indicator light on the front lower surface (See FIG. 1), and are quickly removed exposing these connectors (not shown) for fast beverage filling indicator light replacement. Upper front cover 33 has filling indicator light 15 on its front lower center surface for ice dispensing (above ice chute assembly member 13) (See FIG. 1). Simply tilt open top of upper front cover 33, unplug the connector (not shown), and proceed to lift the upper front cover off of dispensing machine 10 for fast ice filling indicator light replacement.

From fast filling indicator light 15 replacement—to fast fiber optic amplifier 52 DIN rail module, relay control module 86, and power supply 50 replacement—quick, efficient servicing is achieved in the field. The ability to return touchless automatic fiber optic beverage/ice dispenser 10 to immediate service results in saved time and money, while touchless automatic activation ensures utmost sanitation and user enjoyment.

Conclusion, Ramifications, and Scope

The present invention of a touchless automatic fiber optic beverage/ice dispenser has many advantages which revolutionize beverage and or ice dispensing, as compared to old-fashioned, unsanitary manually activated dispensing machines.

This touchless automatic fiber optic beverage/ice dispenser incorporates state of the art photoelectric fiber optic technology. Neither the person nor the cup/container touches the dispensing machine in any way, for sanitary, germ and disease transmission free beverage and or ice dispensing. Gone are unsanitary push activation buttons and levers, and cup/container push activation levers which are frowned upon by health department inspectors. Gone also is the unsanitary practice of sitting the cup/container down on a germ ladened drain grill mounded with dirty ice, to use a push button portion fill or automated fill type of machine.

Endless possibilities of germ and disease transmission from person to person via the dispensing machine are eliminated with touchless automatic activation of product dispensing. Beverage "help yourself" refill stations in fast food restaurants are now even made sanitary; saliva and germs on people's hands and cup/container no longer present a health hazard to beverage and or ice dispensing.

Many additional benefits are gained by the use of a touchless automatic fiber optic beverage/ice dispenser. The dispensing machine is user friendly with the cup/container simply held in a normal filling position to which people are currently accustomed. A filling indicator light illuminates during dispensing, as a signal to the user that product filling is occurring while their cup/container is in the area below the desired product dispensing nozzle. Lit fiber optic terminations guide the user to easily position the cup/container for product dispensation.

Ease of cleaning is a tremendous benefit of the touchless automatic fiber optic beverage/ice dispenser. The lack of cup/container push activation levers and push activation buttons and levers saves tremendous labor and cost incurred in cleaning the dispensing machine. Not only are there fewer surfaces to clean, but the front backdrop to the rear of the dispensing nozzle area now has easy accessibility for cleaning. On large machines with vast banks of product dispensing nozzles, time and effort saved is overwhelming—saving the owner much money, as the employee can be performing other tasks. An "on/off" mode selector control allows easy machine cleaning without undesired automatic product flow occurring, and prevents unauthorized product dispensation.

People will not only appreciate the cleanliness aspect of touchless automatic activation, but they will enjoy the freedom and ease of being in total control over dispensation of products into their cup/container. Any number of products may be dispensed in any volumes desired—to custom mix beverages and or ice to their particular wishes; tea can be diluted with water, additional carbonated soda water can be added to soft drinks, beverage products can be mixed to the person's unique taste, and any amount of ice can be added etc. These user friendly features and commercial duty construction make this beverage/ice dispenser perfect for both commercial restaurant or kitchen use, and home entertainment room enjoyment.

With the touchless automatic fiber optic beverage/ice dispenser, space age design achieves the most important factor of all—total cleanliness.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A method for automatically controlling the dispensing of a flowable product into a container from a product dispensing machine without user or container contact with the dispensing machine for improved sanitation and for preventing transmission of germs by surface-to-surface contact, said method comprising the steps of:

a) providing an optical fiber unit that extends between a light source and a predetermined container-receiving region below a product dispensing nozzle for transmitting light from the light source into the predetermined region from an end of the optical fiber unit;

b) sensing light reflected back to the end of the optical fiber unit from a wall surface of a container positioned within the predetermined region and below the product dispensing nozzle;

c) providing a signal responsive to the sensing of reflected light from the container wall surface and automatically initiating contactless dispensing of the product from the product dispensing nozzle into the container when the container is within the predetermined region;

d) continuing automatic dispensing of the product for the duration of the time the container is within the predetermined region; and e) terminating dispensing of the product upon withdrawal of the container from the predetermined region, and including means for allowing dispensing machine cleaning without automatically actuated product dispensation.

2. A method in accordance with claim 1, wherein the container is a drinking vessel.

3. A method in accordance with claim 1, including the steps of:

a) dispensing into a container from a first product dispensing nozzle a desired quantity of a first product for a first time period; and b) dispensing into the container from a second product dispensing nozzle a desired quantity of a second product for a second time period to provide a desired mixture of dispensed products within a single container.

4. A method in accordance with claim 1, including the steps of:

a) providing a dispensing signal indicative of the commencement and continuation of a dispensing operation, and b) terminating the dispensing signal upon termination of the dispensing operation.

5. A method in accordance with claim 4, wherein the dispensing signal is a visual signal.

6. A method in accordance with claim 5, wherein the visual signal is an indicator light that is turned on during a product dispensing operation and that is turned off when a product dispensing operation is terminated.

7. A method in accordance with claim 6, wherein the indicator light is positioned in association with the dispensing nozzle.

8. A method in accordance with claim 7, wherein the indicator light is positioned above the dispensing nozzle.

9. A method in accordance with claim 6, wherein the indicator light is positioned in association with an ice chute carried by the dispensing machine for dispensing ice.

10. A method in accordance with claim 1, including the step of providing a plurality of adjacent product dispensing nozzles for respective different flowable products to allow a user to select one or more products to be dispensed into a single container.

11. A method in accordance with claim 10, wherein the flowable products include beverages and ice.

12. A method in accordance with claim 1, including means for preventing unauthorized product dispensation.

13. A method in accordance with claim 1, wherein the sensing step is accomplished optically by directing a light beam into the predetermined region and by detecting whether the light beam is reflected off a surface within the predetermined region.

14. A method in accordance with claim 13, including providing an optical fiber that extends from a light source to a lens system that is positioned to direct the light into the predetermined region.

15. A method in accordance with claim 1, wherein a supply of ice is provided in the machine, and including the step of periodically agitating the ice supply to facilitate dispensing of ice through an ice dispensing nozzle when a container is positioned within the predetermined region adjacent the ice dispensing nozzle.

16. A method in accordance with claim 1, wherein a supply of ice is provided in the machine, and including the step of agitating the ice supply during dispensation of ice through an ice dispensing nozzle when a container is positioned within the predetermined region adjacent the ice dispensing nozzle.

17. A method in accordance with claim 1, wherein the predetermined region is a region within which a fill opening of the container is positioned below the at least one dispensing nozzle to receive flow of a product without product spillage outside the container.

18. A method in accordance with claim 1, wherein the sensing step is effected utilizing a fiber optic proximity sensor.

19. A method in accordance with claim 18, wherein the fiber optic proximity sensor includes an optical fiber unit.

20. A method in accordance with claim 19, wherein the optical fiber unit is a diffuse optical fiber unit.

21. A method in accordance with claim 1, wherein the container-receiving regions below respective dispensing nozzles are independent of each other to prevent undesired dispensing of a product from an adjacent dispensing nozzle under which no container is present.

22. A method in accordance with claim 1, wherein the end of the fiber optic unit both transmits light into the predetermined region and receives light reflected from the container within the predetermined region.

23. A method in accordance with claim 1, wherein the termination of dispensing occurs automatically upon withdrawal of the container from the predetermined region.

24. A method for automatically controlling the dispensing of a flowable product into a container from a product dispensing machine without user or container contact with the dispensing machine for improved sanitation and for preventing transmission of germs by surface-to-surface contact, said method comprising the steps of:

a) passing diffused light through a lens that faces a predetermined container-receiving region below a product dispensing nozzle;

b) sensing diffused light that is reflected from a wall surface of a container placed within the predetermined region;

c) automatically initiating continuous contactless dispensing of the product from the product dispensing nozzle into the container for the duration of the time the container is within the predetermined region; and d) terminating dispensing of the product upon withdrawal of the container from the predetermined region, and including means for allowing dispensing machine cleaning without automatically actuated product dispensation.

25. A method in accordance with claim 24, including the steps of providing light transmitting means that includes an optical fiber unit having a first end in communication with a light source for transmitting light through the optical fiber unit to emanate from a second end of the fiber unit spaced from the light source, wherein the second end of the optical fiber unit transmits light to the lens and receives light reflected by the container.

26. A method in accordance with claim 25, wherein the lens has an outwardly-facing, convex, substantially cylindrical surface.

27. A method in accordance with claim 26, wherein the lens is a semi-cylindrical element having a substantially flat surface facing the second fiber end.

28. A method in accordance with claim 25, including a clear optical rod positioned between the second end of the optical fiber unit and the lens.

29. A method in accordance with claim 28, wherein the optical rod is translucently frosted on at least one end to diffuse light passing therethrough.

30. A method in accordance with claim 28, wherein the optical rod is translucently frosted at each of two opposite ends thereof.

31. A method in accordance with claim 24, including the steps of:
   a) providing a dispensing signal indicative of the commencement and continuation of a dispensing operation, and
   b) terminating the dispensing signal upon termination of the dispensing operation.

32. A method in accordance with claim 31, wherein the dispensing signal is a visual signal.

33. A method in accordance with claim 32, wherein the visual signal is an indicator light that is turned on during a product dispensing operation and that is turned off when a product dispensing operation is terminated.

34. A method in accordance with claim 33, wherein the indicator light is positioned in association with the dispensing nozzle.

35. A method in accordance with claim 34, wherein the indicator light is positioned above the dispensing nozzle.

* * * * *